United States Patent [19]

Hasegawa et al.

[11] Patent Number: 5,019,320

[45] Date of Patent: May 28, 1991

[54] GOLF BALL

[75] Inventors: Yoshimi Hasegawa, Yokosuka; Shinichi Kakiuchi, Yokohama; Seisuke Tomita, Tokorozawa, all of Japan

[73] Assignee: Bridgestone Corporation, Tokyo, Japan

[21] Appl. No.: 513,479

[22] Filed: Apr. 23, 1990

[30] Foreign Application Priority Data

Apr. 24, 1989 [JP] Japan ................................. 1-104103

[51] Int. Cl.$^5$ ............................................. A63B 37/12
[52] U.S. Cl. ............................ 273/235 R; 260/998.14; 524/487; 524/908
[58] Field of Search ..................... 273/235 R; 524/908, 524/487; 260/998.14

[56] References Cited

U.S. PATENT DOCUMENTS

| | | | |
|---|---|---|---|
| 4,526,375 | 7/1985 | Nakade | 273/235 R |
| 4,567,219 | 1/1986 | Tominaga et al. | 260/998.14 |
| 4,679,795 | 7/1987 | Melvin et al. | 273/235 R |
| 4,911,451 | 3/1990 | Sullivan et al. | 273/235 R |

*Primary Examiner*—Allan M. Lieberman
*Attorney, Agent, or Firm*—Sughrue, Mion, Zinn, Macpeak & Seas

[57] ABSTRACT

A covering composition comprising an ionomer resin and a low-molecular weight polyethylene wax has improved impact resistance. A golf ball having a core enclosed in a cover thereof is fully durable and exhibits satisfactory flying performance.

17 Claims, 1 Drawing Sheet

GOLF BALL

This invention relates to a golf ball comprising a core enclosed in a cover, and more particularly, to such a golf ball which is rendered more durable by improving the impact resistance of the cover.

BACKGROUND OF THE INVENTION

The recent mainstream of the covering material for thread-wound and two-piece golf balls is an ionomer resin characterized by high repulsion and cut resistance. Since golf players have a continuous demand for higher flying performance and durability, it is desired to develop a covering material of higher quality.

The ionomer resin covering material generally contains a pigment for increasing the whiteness of the material, for example, titanium dioxide and zinc oxide, and a dispersant for the pigment, for example, fatty acid metal salts such as magnesium stearate. The covering material was applied to thread-wound cores or solid cores by compression molding of half cups or injection molding. However, either of the molding methods often failed to obtain a fully impact-resistant cover layer because the ionomer resin in the covering material has a high degree of orientation. It was thus difficult to manufacture golf balls having sufficient durability to fully meet the demand of golf players. Further, the fatty acid metal salt dispersants such as magnesium stearate tend to gasify upon injection of the covering material, undesirably sticking to the mold surface. Such deposits can also adhere to the cover surface to adversely affect its receptivity to a lacquer coating.

In the prior art, it was proposed to add linear low-density polyethylene and medium-density polyethylene to ionomer resin based covering materials in order to improve their impact resistance (see Japanese Patent Publication Nos. 58855/1988 and 58856/1988). These covering materials, however, suffer from variations in physical properties due to the poor dispersion of such polyethylene.

SUMMARY OF THE INVENTION

Therefore, a primary object of the present invention is to provide a novel and improved golf ball having a durable cover. Another object is to improve the impact resistance of an ionomer resin-based covering material without causing a variation in physical properties. A further object is to improve the moldability in a mold and the lacquer receptivity of an ionomer resin-based covering material.

The inventors have found that when an ionomer resin-based covering material is blended with a dispersant in the form of a low-molecular weight polyethylene wax having an average molecular weight of about 1,000 to about 10,000, preferably about 1,500 to about 5,000, the covering material is improved in flow and reduced in orientation so that its impact resistance can be improved without accompanying variations in physical properties. This dispersant eliminates the problems of moldability and lacquer receptivity as observed with fatty acid metal salt dispersants. The polyethylene wax, when blended in an amount of 0.1 to 6 parts, preferably 0.5 to 5 parts, more preferably 1.0 to 2.5 parts by weight per 100 parts by weight of the ionomer resin, can impart impact resistance to the ionomer resin without a loss of impact resilience and cut resistance inherent thereto. Therefore, by coating a thread-wound core or solid core with the covering material, there is obtained a golf ball having high flying performance and improved durability. The present invention is predicated on this finding.

The present invention thus provides a golf ball comprising a core enclosed in a cover, characterized in that the cover is formed of a composition comprising 100 parts by weight of an ionomer resin and 0.1 to 6 parts by weight of a low-molecular weight polyethylene wax.

BRIEF DESCRIPTION OF THE INVENTION

FIG. 1 is a cross-sectional view of a golf ball according to one embodiment of the invention.

DETAILED DESCRIPTION OF THE INVENTION

Figure 1:
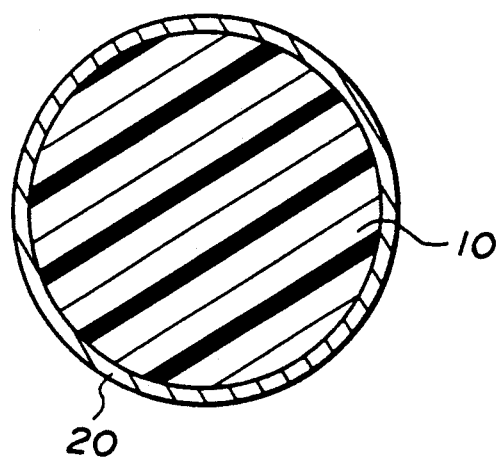

Referring to FIG. 1, there is illustrated a golf ball of the invention as comprising a core 10 enclosed in a cover 20. The cover is formed of a composition comprising 100 parts by weight of an ionomer resin and 0.1 to 6 parts by weight of a low-molecular weight polyethylene wax.

The ionomer resin which is a base polymer of the covering composition may be selected from conventional ionomer resins which are commonly used as golf ball covering material. The ionomer resin is an ionic copolymer of an olefin having 2 to 5 carbon atoms and a metal salt of an unsaturated monocarboxylic acid having 2 to 8 carbon atoms. Its commercially available examples are Surlyn series of E. I. duPont and Hymilan series of Mitsui Poly-Chemical K. K., with Hymilan 1706, 1605 and 1707 being especially preferred.

The low-molecular weight polyethylene wax blended as the dispersant includes polyethylene waxes having an average molecular weight (Mw) of about 1,000 to about 10,000, preferably about 1,500 to about 5,000. Its commercially available examples are Sunwax 131-P (Mw 3500), 151-P (Mw 2000), 161-P (Mw 5000), 165-P (Mw 5000), and 171-P (Mw 1500) of Sanyo Chemical Industry K.K. The low-molecular weight polyethylene wax serves as a dispersant for a pigment which will be described later and is effective to improve the impact resistance of the covering composition by reducing its orientation. The polyethylene wax is blended in an amount of 0.1 to 6 parts, preferably 0.5 to 5 parts, more preferably 1.0 to 2.5 parts by weight per 100 parts by weight of the ionomer resin. Less than 0.1 part of polyethylene wax is too small to achieve impact resistance improvement whereas more than 6 parts will detract from cut resistance.

The covering composition used in the golf ball of the invention is basically a combination of an ionomer resin and a low-molecular weight polyethylene wax as defined above, but may contain pigments, elastomers, and other additives if desired. Examples of the pigment include titanium dioxide and zinc oxide and the pigment is used in an amount of 2 to 5 parts by weight per 100 parts by weight of the ionomer resin. Examples of the elastomer include polyester elastomers, typically polyethylene elastomer and the elastomer is used in an amount of 0 to 30 parts by weight per 100 parts by weight of the ionomer resin.

The covering composition may be obtained simply by uniformly mixing these essential and optional ingredients. When the pigment is blended in the composition, the low-molecular weight polyethylene wax serves as a dispersant therefore. There is no need for conventional fatty acid metal salt dispersants such as magnesium stearate. Therefore, the invention eliminates the problems of moldability (e.g., mold release and sticking) and lacquer receptivity as observed with the conventional fatty acid metal salt dispersants.

The golf ball of the invention is manufactured by coating a thread-wound core or solid core with the covering composition defined above. For the application of the covering composition, compression molding of half cups, injection molding, and other conventional molding methods can be employed. More particularly, the core is enclosed in a pair of preformed semi-spherical cover segments, followed by forming under heat and pressure. Alternatively, the cover composition is injection molded over the core.

The resultant cover preferably has a thickness of 1.5 to 2.5 mm and a hardness of 60 to 70 in Shore D hardness scale. The cover may be provided with dimples in any desired pattern.

The present invention may be applied to any type of golf ball including small balls having a diameter of at least 41.15 mm and a weight of up to 45.92 g, and large balls having a diameter of at least 42.67 mm and a weight of up to 45.92 g.

There has been described a covering composition comprising an ionomer resin and a low-molecular weight polyethylene wax, which possesses improved impact resistance, moldability, and lacquer receptivity. The golf ball having a core enclosed in the covering composition is fully durable and exhibits satisfactory flying performance.

EXAMPLE

Examples of the invention are given below by way of illustration and not by way of limitation.

EXAMPLES 1-6 AND COMPARATIVE EXAMPLES 1-4

Two solid cores A and B were formed by molding the core materials shown in Table 1 and vulcanizing for 30 minutes at 150° C.

TABLE 1

| Type | A | B |
| --- | --- | --- |
| Composition (parts by weight) | | |
| Cis-1,4-polybutadiene | 100 | 100 |
| Zinc acrylate | 35 | 35 |
| Zinc oxide | 19 | 16 |
| Dicumyl peroxide | 1 | 1 |

TABLE 1-continued

| Type | A | B |
| --- | --- | --- |
| Core diameter, mm | 38.0 | 39.0 |

Each of solid cores A and B was coated with the covering composition shown in Table 2 by injection molding. There were prepared ten types of large-size two-piece golf balls having a diameter of 42.6 mm. Lacquer was applied to the ball surface, completing the ball. It was found that the golf balls according to the invention could be smoothly taken out of the mold, that is, improved in mold release and that the lacquer coating firmly adhered to the ball surface.

The balls were examined for hardness, initial speed, durability, and cut resistance by the following tests.

Hardness

A deflection (in mm) of a ball under a constant load of 100 kg was measured.

Initial Speed

An initial speed (in m/sec.) was measured by hitting a ball at a head speed of 45 m/sec. using a swing robot (manufactured by True Temper K.K.).

Durability

Using a swing robot (manufactured by True Temper K.K.) equipped with a driver, a ball was hit 50 times at a head speed of 45 m/sec. The number of cracked balls among 10 balls for each type was reported in a relative index, provided that Comparative Example 1 was 100.

Cut Resistance

A knife of 1.5 kg at a height of 35 cm was dropped on a ball 50 times. The number of cut balls among 50 balls for each type was reported in a relative index, provided that Comparative Example 1 was 100.

The polyester elastomer and polyethylene waxes used in the cover compositions are identified below.
Polyethylene elastomer:

It consisted of terephthalic acid, 1,4-butanediol, isophthalic acid, and polytetramethylene oxide glycol ($M_{10}$ 70 kg/cm$^2$, resilience 47%). Polyethylene wax (1):Sunwax 171-P (Mw 1500) Polyethylene wax (2):Sunwax 131-P (Mw 3500) Polyethylene wax (3):Sunwax 161-P (Mw 5000)

All manufactured by Sanyo Chemical Industry K.K.

TABLE 2

|  | E1 | E2 | E3 | E4 | E5 | E6 | CE1 | CE2 | CE3 | CE4 |
| --- | --- | --- | --- | --- | --- | --- | --- | --- | --- | --- |
| Cover composition (pbw) | | | | | | | | | | |
| Hymilan 1706 ionomer resin | 50 | 50 | 50 | 50 | 100 | 40 | 50 | 100 | 40 | 50 |
| Hymilan 1605 ionomer resin | 50 | 50 | 50 | 50 | — | 40 | 50 | — | 40 | 50 |
| Polyester elastomer | — | — | — | — | — | 20 | — | — | 20 | — |
| Titanium dioxide | 2 | 2 | 2 | 2 | 2 | 2 | 2 | 2 | 2 | 2 |
| Magnesium stearate | — | — | — | — | — | — | 1 | 1 | 1 | — |
| Polyethylene wax (1) | 1.5 | — | — | 5 | — | — | — | — | — | 7 |
| Polyethylene wax (2) | — | 0.9 | — | — | 1.9 | 1.9 | — | — | — | — |
| Polyethylene wax (3) | — | — | 2 | — | — | — | — | — | — | — |
| Cover composition's physical properties | | | | | | | | | | |
| Melt index | 2.4 | 1.7 | 2.5 | 3.4 | 2.0 | 2.4 | 1.5 | 1.2 | 1.8 | 4.1 |
| Hardness, Shore D | 66 | 66 | 66 | 65 | 66 | 63 | 66 | 66 | 63 | 65 |
| Core type | A | A | A | A | A | B | A | A | B | A |
| Ball properties | | | | | | | | | | |
| Cover gauge, mm | 2.3 | 2.3 | 2.3 | 2.3 | 2.3 | 1.8 | 2.3 | 2.3 | 1.8 | 2.3 |
| Ball weight, g | 45.4 | 45.3 | 45.3 | 45.4 | 45.2 | 45.3 | 45.3 | 45.3 | 45.2 | 45.3 |
| Ball hardness, mm | 2.3 | 2.3 | 2.4 | 2.4 | 2.2 | 2.4 | 2.3 | 2.3 | 2.3 | 2.5 |
| Initial speed, m/s | 67.0 | 67.0 | 66.9 | 66.8 | 66.7 | 66.9 | 67.0 | 66.7 | 66.9 | 66.6 |

TABLE 2-continued

| | E1 | E2 | E3 | E4 | E5 | E6 | CE1 | CE2 | CE3 | CE4 |
|---|---|---|---|---|---|---|---|---|---|---|
| Durability | 125 | 120 | 125 | 115 | 108 | 124 | 100 | 88 | 102 | 100 |
| Cut resistance | 100 | 100 | 100 | 98 | 105 | 90 | 100 | 105 | 90 | 85 |

As seen from Table 1, the golf balls of the invention are improved in durability without detracting from flying performance (initial speed) and cut resistance.

Although some preferred embodiments have been described, many modifications and variations may be made thereto in the light of the above teachings. It is therefore to be understood that within the scope of the appended claims, the invention may be practiced otherwise than as specifically described.

WE CLAIM:

1. A gold ball comprising a core enclosed in a cover, characterized in that said cover is formed of a composition comprising 100 parts by weight of an ionomer resin comprising an ionic copolymer of an olefin having 2 to 5 carbon atoms and a metal salt of an unsaturated monocarboxylic acid having 2 to 8 carbon atoms, and 0.1 to 6 parts by weight of a low-molecular weight polyethylene wax having an average molecular weight of about 1000 to about 10,000.

2. The golf ball of claim 1 wherein the covering composition contains 0.5 to 5 parts by weight of polyethylene wax.

3. The golf ball of claim 1 wherein the polyethylene wax has an average molecular weight of about 1,500 to about 5,000.

4. The golf ball of claim 1 wherein the covering composition contains a pigment.

5. The golf ball of claim 1 wherein the covering composition comprises 0.5 to 5 parts by weight of polyethylene wax.

6. The gold ball of claim 5 wherein the covering composition comprises 1.0 to 2.5 parts by weight of polyethylene wax.

7. The golf ball of claim 1 wherein the covering composition further comprises an elastomer.

8. The golf ball of claim 7 wherein the elastomer is polyester elastomer.

9. The gold ball of claim 8 wherein the elastomer is polyethylene elastomer.

10. The golf ball of claim 7 wherein the elastomer is used in amounts of up to 30 parts by weight per 100 parts by weight of the ionomer resin.

11. The golf ball of claim 4 wherein the pigment is selected from titanium dioxide and zinc oxide.

12. The golf ball of claim 4 wherein the pigment is used in an amount of 2 to 5 parts by weight per 100 parts by weight of the ionomer resin.

13. The golf ball of claim 1 wherein the cover has a thickness of 1.5 to 2.5 mm.

14. The golf ball of claim 1 wherein the cover has a hardness of 60 to 70 in Shore D hardness scale.

15. The golf ball of claim 1 wherein the cover is provided with dimples.

16. The golf ball of claim 1 wherein the diameter is at least 41.15 mm and the weight is up to 45.92g.

17. The golf ball of claim 1 wherein the diameter is at least 42.67 mm and the weight is up to 45.92g.

* * * * *